United States Patent [19]

Gupta

[11] Patent Number: 4,891,504

[45] Date of Patent: Jan. 2, 1990

[54] SECURITY LEVEL IDENTIFICATION METHOD FOR COMPUTER BASED INFORMATION

[75] Inventor: Om P. Gupta, Ithaca, N.Y.

[73] Assignee: Digicomp Research Corp., Ithaca, N.Y.

[21] Appl. No.: 745,799

[22] Filed: Jun. 17, 1985

[51] Int. Cl.4 .................. G06K 7/10; G06K 19/08
[52] U.S. Cl. ................... 235/462; 235/375; 235/469; 360/60; 369/47; 369/52
[58] Field of Search .............. 360/133, 72.1, 60; 235/375, 376, 382, 469, 465, 436, 462, 493, 487; 369/47, 52; 434/315, 316

[56] References Cited

U.S. PATENT DOCUMENTS

| | | | |
|---|---|---|---|
| 3,818,190 | 6/1974 | Silverman et al. | 235/382 |
| 3,835,297 | 9/1974 | Inoue et al. | 235/469 |
| 3,894,217 | 7/1975 | Ebukuro et al. | 235/469 |
| 4,129,073 | 12/1978 | Ritzerfeld | 235/469 |
| 4,132,350 | 1/1979 | Kubota et al. | 235/493 |
| 4,204,639 | 5/1980 | Barber et al. | 235/462 |
| 4,481,412 | 11/1984 | Fields | 235/383 |
| 4,485,421 | 11/1984 | Hoshino | 360/133 |
| 4,611,205 | 9/1986 | Eglise | 364/465 |
| 4,621,188 | 11/1986 | Stockburger et al. | 235/382 |
| 4,677,604 | 6/1987 | Selby et al. | 360/72.1 |

OTHER PUBLICATIONS

Radio Shack, "Portable Reference Guide, TRS-80 Model 4P", pp. 4-7, 1983.

Primary Examiner—Alan Faber
Assistant Examiner—Robert A. Wehnhardt
Attorney, Agent, or Firm—Ralph R. Barnard

[57] ABSTRACT

A multi-classification information security method to prevent information in a computer information system with one of a plurality of security classifications to be written onto an input/output means with a non-compatible security classification. The method may also prevent information with one of a plurality of security classifications from being accessed by a user with a different classification. A detector means located in the computer input/output device detects the classification of the input/output means which is indicated by color or bar code indicia located on the input/output means. This input/output means classification is compared with the classification of the information. When the classifications correspond, information can be written to the input/output medium.

10 Claims, 3 Drawing Sheet

SECURITY LEVEL IDENTIFICATION METHOD FOR COMPUTER BASED INFORMATION

FIELD OF THE INVENTION

The invention pertains to methods of securing computer stored information. More specifically, the invention provides a security method for computer systems which are utilized to process or store information having a plurality of security classifications.

DESCRIPTION OF THE PRIOR ART

Throughout the Department of Defense and other government agencies visible markings are extensively used to identify the classification of information bearing documents. These easily identifiable markings are a great aid for enforcing information protection mechanisms.

Today, however, many documents are now prepared and/or stored on computers or word processing systems. Unlike manually prepared paper documents there are often no colored cover sheets on computer printouts or magnetic media, so that the nature of the data on the media is not easily ascertainable by users or security personnel. Two major problems arise from this situation. First, there is no way to prevent data of differing classifications from being placed on the same storage medium, or to prevent high security information from being written on to low-security coded media. Second, there is no easy way to prevent limited-access users, once they possess the storage medium, from viewing the entire information residing on the medium. Third, even if the information is properly stored, there is no easy way for security personnel to determine the level of data stored, for example, in a floppy disk left on top of a desk at night.

At present computer systems are used in a dedicated security level mode. That is, some systems assume that certain devices will be used only for processing information of certain classifications. Running systems in a dedicated mode with such a limitation is expensive and a poor utilization of resources.

Thus, it is an object of the invention to provide a simple and efficient method to segregate and protect information stored in a system with a plurality of information classifications.

DISCLOSURE DOCUMENT

This invention is the same as filed in Disclosure Document No. 122,556 on Nov. 23, 1983.

SUMMARY OF THE INVENTION

A color coding technique similar to the above paper document protection mechanism may be used to code the media. The method of the invention ensures that the user uses the proper level medium to store the computer generated information. It also may ensure that users will be incapable of accessing information of classifications they are unauthorized to access.

The medium (such as a floppy disk) to be protected is coded according to the security level of the data prescribed to be written thereon. Preferably, the coding is human- as well as machine-readable, such as conspicuous bands of color. The invention uses detectors in the device which access the medium (e.g. a disk drive) for sensing the level of the medium and matching it with the level of information being stored on it. If the two levels are not compatible, the user is informed and prompted to use an appropriate medium. The user will not be permitted to read from or write to the I/O medium if an appropriate medium is not used.

DESCRIPTION OF THE PREFERRED EMBODIMENT

Figure 1:
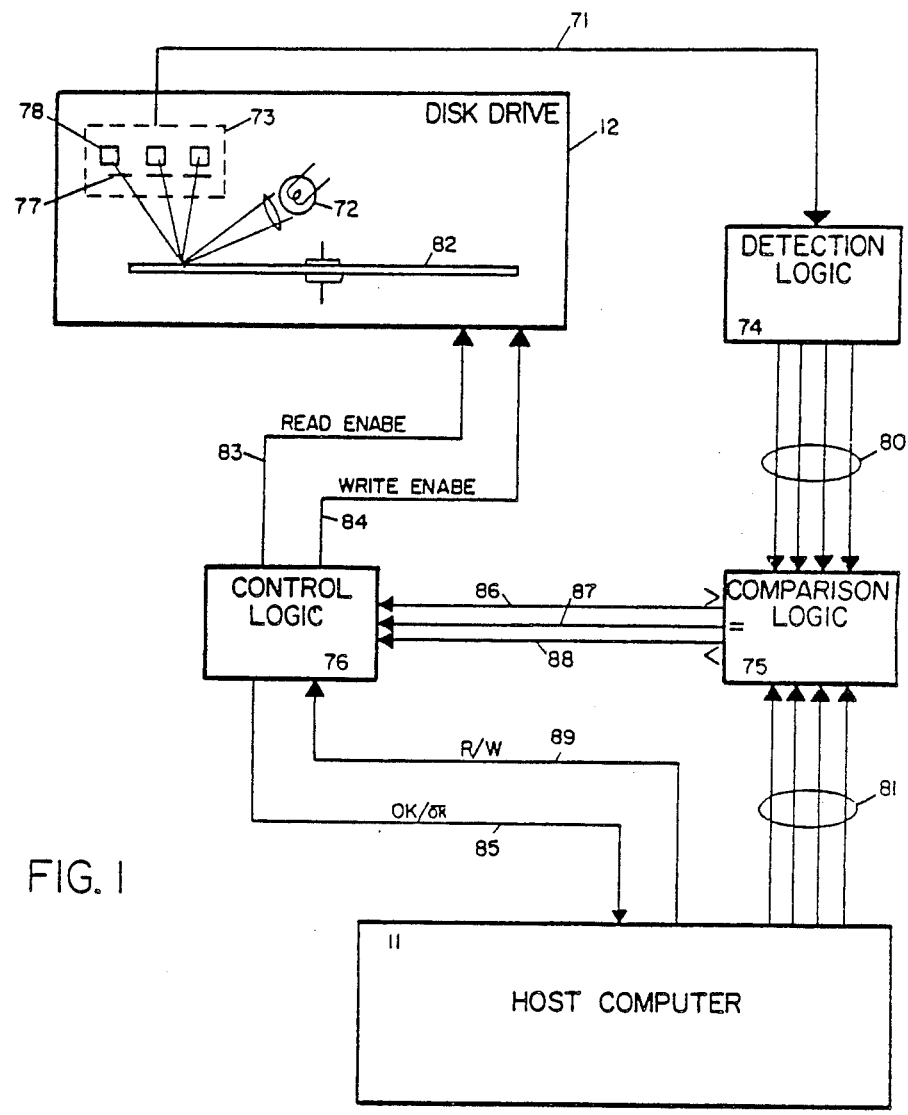
FIG. 1 illustrates schematically a hardware arrangement which could be used in a floppy disk drive adapted for use with the invention.

The preferred embodiment of the invention can be seen in use with (FIG.1) in a computer system comprising a microcomputer (1) having a disk drive (12). The preferred embodiment of the invention adds color coding to the storage media to signify a security level, for example red for top secret, etc. The color coding may comprise labels (FIG. 2) (21) applied to the floppy diskettes, or the like, or stripes (FIG. 5)(61) along the margin of computer paper (65). Detectors (73) and (64) are located in the disk drive (12) and the printer (60), respectively, in appropriate locations to view and detect the coding applied to the media.

Color is especially preferred as the indicia of security level to be used in the method of the invention, because it is at the same time easily perceptible to both humans and computers. Security personnel and computer users in installations subject to security restrictions are already used to color coding security level. Although this preferred color coding will be discussed at length herein, it will be recognized by one skilled in the art that other methods of coding, such as bar-codes or non-human perceptible markings such as magnetic or UV/IR sensitive inks may be used as well, with appropriate detectors. In such a case, it would be desireable, if not essential, to also code the security level on the media in a human-perceptible form. In very high security applications, a combination of human perceptible warnings and an invisible (and thus difficult to forge) machine-readable indicia would be preferred, and easily implemented within the teachings of the invention.

Figure 2:
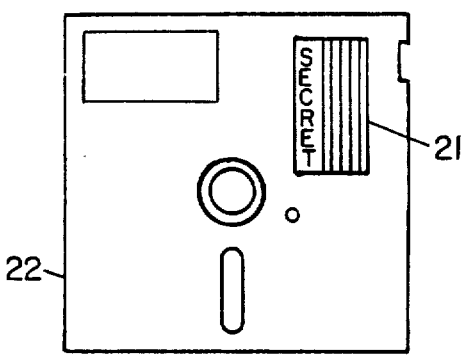
FIG. 2 depicts a floppy diskette with a coded label.

Looking at FIG. 2 as an example, a colored label (21) can be attached to the jacket (22) of the floppy diskette. The number of different colors which could be applied corresponds to the number of information security classifications. The colored label provides notice to the user about what classification of information resides on the diskette. The label also will be used by the computer system to ensure that the system's information is segregated and protected.

Alternatively, diskettes are commercially available with colored jackets (22). If such diskettes are used, the color of the jacket will serve as the security level indicia, and the detectors will be placed to view the jacket color. This would allow for detection of a much larger area, and minimize the possibility of mis-placement of the indicia. Also, the jacket color can not be easily changed or masked, an advantage in some applications.

As a further alternative, the magnetic surface of the disk (23) could be color coded.

After the diskette is placed in the disk drive a lamp (72) or similar illuminator located near the surface of the floppy diskette shines a light beam on the indicia a portion of the diskette surface where the color is to be detected. The color detector means (73) then determines the color of the indicia. If the color is compatible with the security level of the user the user will be able to read from and/or write to the floppy diskette. If the color is incompatible the user will be alerted to use a diskette with a properly coded label.

It is also possible within the teachings of the invention to mount the illuminator detector system in such a way that it may move over the surface of the medium whose color is to be detected. If the movement is random, this would make it harder to put a small sticker at one predicable spot, dump highly classified material on a lower classified medium, and remove the spot. With a large colored label, or colored media, the random movement of the detector would not affect properly coded media. If the detector is capable of movement in a predicable way (i.e. along the front or top of the diskette), then this would allow flexibility in the placement of the color label, or, alternatively, allow multiple labels on one diskette, within the teachings of the invention.

The color detector means and detection logic will now be described in more detail. One skilled in the art can easily implement the color detector means and detection logic into a microcomputer system, using conventional parts and circuitry.

The disk drive (12) houses a lamp (72) shining on the surface of the diskette (82), and color detector means (73), detecting the light reflecting from the diskette. The detector (73), as shown, could comprise a plurality of filters (77) of different colors (i.e. red, green, blue) filtering the light entering a plurality of photodetectors (78). The output (71) of the photodetectors (78) will thus vary depending on the color of the light, and the color may be determined from the different output levels of the photodetectors. The output of the color detector means is input into the detection logic (74), which determines the color detected and represents the result as, for example, a four-bit number (80) representing a security level.

The comparison logic (75) compares this number, representing security level of the disk with a similar four-bit number (81) supplied by the host computer (11), representing the security level of the data which is proposed to be written on the disk (or, in another application, the security level of the user).

Figures 5, 6:
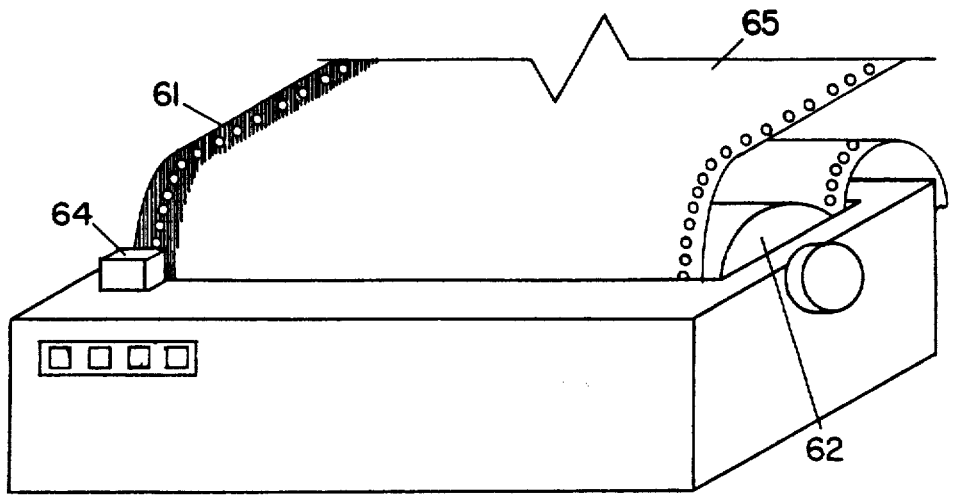
FIG. 5 shows a printer with a lamp and color detector means, for use with the invention.
FIG. 6 is a truth table showing the possible outcomes of a comparison of security levels.

The comparison logic produces a result which is sent to the control logic (76). The control logic, finally, controls whether the user will be able to read/write information to the diskette, by enabling a read enable line (83), write enable line (84) to the disk drive (12) or setting a user information bit (85) (i.e. access OK/Not OK) for return to the host computer (11), or a combination of these, as appropriate to the application. The proper settings of these lines may be easily determined from the result of the comparison (diskette level less than current computer level (86), levels are equal (87), or diskette level greater than current computer level (88)) and the action to be taken (read/write (89)), using simple gates in circuitry which would be obvious to one skilled in the art. FIG. 6 shows a truth table which represents the possible outcomes of the comparison.

For example, if the host computer proposes to write top-secret information, it might assert security code 15 (binary 1111) at lines (81), and "write" (say binary "1") at read/write line (89). If the diskette (82) in the drive is intended for recording only confidential information (a much lower class) it might have a blue jacket. The detection logic (74) might recognize the color blue based on the output of the detector (73) and encode a relatively low number, say 2 (binary 0010) on lines (80). The comparison logic (75) would compare these, and raise "less than" line (86). The control logic would then disable write (84) and place a "not OK" signal (say, binary 0) on line (85), telling the host that writing the information is denied due to security violation.

In another example, suppose a user with only "proprietary" clearance wishes to read a disk which is coded red "top secret". The detection logic would assert "1111" on lines (80), and the host would assert, say, "0001" on lines (81) and "0" on line (89). The comparison logic (75) would raise "greater than" line (88), indicating that the security level on the disk is higher than that of the host. The control logic (76) would then disable read (83) and once again place a "not OK" signal on line (85).

The color detector means and detection logic for the printer used with the method of the invention could have a similar configuration (FIG. 5). The color detector means (64) is mounted in proximity to the platen or print area (62) on one side of the printer, where it can observe the coded side of the paper. A vertical series of stripes or band of color (61) is located along the margin of the computer paper (65). The user will be able to write information to the paper if the security level of the paper is compatible with the level of the data to be printed.

Figure 3:
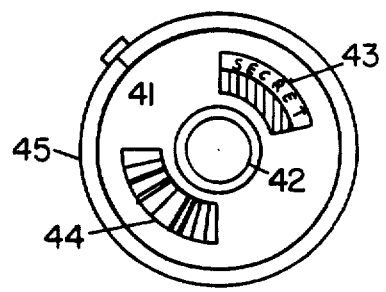
FIG. 3 shows a magnetic tape coded for use with the invention.
Figure 4:
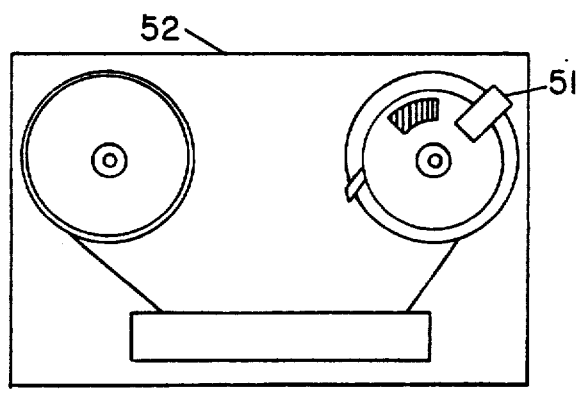
FIG. 4 shows a tape drive adapted for use with the invention.

Another alternative embodiment of the invention can be seen in FIGS. 3 and 4. A detector means (51) is mounted near the tapes in a tape drive. A colored label (43) is located on the tape reel (41). Alternatively, the hub of the reel (42) or the sleeve (45) could be color coded. The detector means (51) would then be a color detector means. Rather than a color coding system, a bar code system can be used. A bar code (44) would then be located on the magnetic tape reel (41). The detector means would then be a bar code reader.

Accordingly, it is to be understood that the embodiments of the invention herein described are merely illustrative of the application of the principles of the invention. Reference herein to details of the illustrated embodiments are not intended to limit the scope of the claims which themselves recite those features regarded as essential to the invention.

I claim:

1. In a computer information system of the type having a plurality of input/output devices adapted to read from and/or write information to input/output medium means for input and/or output of information, the information and the medium being associated with one or more of a plurality of security levels, the information being coded as to the level of security associated therewith, the improvement comprising the method of providing multi-level security comprising the steps of:
   a. coding the input/output medium by applying one of a plurality of machine and visually detectable indicia indicating the level of security of information to be read and/or written thereon;
   b. detecting the security level of the input/output medium through a detector means located in the input/output device for reading the machine and visually detectable indicia and providing the computer information system with a security code corresponding to the security level coded on the input/output medium through the indicia applied thereto;

c. determining from the computer the security level of information which is to be subject to output from the computer or the security level of the user who wishes to use input information from the medium;

d. Comparing the security level determined in step c with the input/output medium security level detected in step b;

e. permitting the information to be read from or written to the input/output medium only if the security level of the information and the security code of the media are compatible.

2. The method of claim 1 in which the indicia comprises a, human readable and comprehensible bear code, located on the input/output medium and the detector means is a bar code reader.

3. The method of claim 1 in which the indicia is color which is applied to at least a portion of the input/output medium and the detector means comprises color detection means comprising:

a. illuminator means for directing a light on at least a portion of the input/output medium;

b. color detector means for generating a signal responsive to the light reflecting from the portion of the input/output medium, having an input for the reflected light and an output responsive to the color of the surface;

c. output means for generating a code indicative of the color detector by the color detector means.

4. The method of claim 3 in which the indicia comprises bands of color applied to at least a portion of the input/output medium.

5. The method of claim 3 in which the input/output medium is a disk having a magnetic recording portion and a jacket and the input/output device is a disk drive.

6. The method of claim 5 in which the indicia is a label applied to the disk.

7. The method of claim 5 in which the indicia is the color of the disk jacket.

8. The method of claim 5 in which the indicia is the color applied to the magnetic recording portion of the disk.

9. The method of claim 1 in which the input/output medium is computer tape on a tape reel and the input/output device is a tape drive, and the indicia is applied to the said tape reel.

10. The method of claim 3 in which the output medium is paper and the output device is a printer.

* * * * *

UNITED STATES PATENT AND TRADEMARK OFFICE
CERTIFICATE OF CORRECTION

PATENT NO. : 4,891,504

DATED : January 2, 1990

INVENTOR(S) : Om P. Gupta

It is certified that error appears in the above-identified patent and that said Letters Patent is hereby corrected as shown below:

In the drawings, the second and third sheets containing Figures 2-6 should be added as per attached sheets.

Column 5, line 22, "bear code" should be -- bar code --.

Signed and Sealed this

Twenty-fourth Day of April, 1990

Attest:

HARRY F. MANBECK, JR.

*Attesting Officer*  *Commissioner of Patents and Trademarks*

| INPUTS | | OUTPUTS | | |
|---|---|---|---|---|
| READ/WRITE | <=> | READ ENABLE | WRITE ENABLE | OK |
| READ | < | YES | — | YES |
|  | = | YES | — | YES |
|  | > | NO |  | NO |
| WRITE | < | — | NO | NO |
|  | = | — | YES | YES |
|  | > | — | YES/NO* | YES/NO* |

*DEPENDING ON APPLICATION